(12) United States Patent
Laster et al.

(10) Patent No.: US 7,976,051 B1
(45) Date of Patent: Jul. 12, 2011

(54) DOLLY ALIGNMENT GUIDE FOR LARGE, MULTI-TRAILER/VAN RIGS

(76) Inventors: Michael A. Laster, Jacksonville, AR (US); Glenn Hart, Kansas City, MO (US)

( * ) Notice: Subject to any disclaimer, the term of this patent is extended or adjusted under 35 U.S.C. 154(b) by 325 days.

(21) Appl. No.: 12/189,380

(22) Filed: Aug. 11, 2008

Related U.S. Application Data

(63) Continuation-in-part of application No. 10/878,932, filed on Jun. 29, 2004, now abandoned.

(51) Int. Cl.
*A01B 59/041* (2006.01)
*B60D 1/36* (2006.01)

(52) U.S. Cl. ............... 280/477; 280/474; 280/476.1; 280/491.2

(58) Field of Classification Search ............ 280/408, 280/456.1, 460.1, 474, 476.1, 477, 478.1, 280/482, 491.1, 491.2
See application file for complete search history.

(56) References Cited

U.S. PATENT DOCUMENTS

| | | | |
|---|---|---|---|
| 2,497,234 A | 2/1950 | Mylie | |
| 3,612,572 A | 10/1971 | Raidel | |
| 3,612,575 A | 10/1971 | Stewart | |
| 3,612,578 A | 10/1971 | Bagnulo | |
| 3,663,039 A | 5/1972 | Morgan | |
| 3,746,369 A | 7/1973 | Neff et al. | |
| 3,815,939 A | 6/1974 | Pettay | |
| 4,230,335 A | 10/1980 | Glassmeyer | |
| 4,573,699 A * | 3/1986 | Smith | 280/432 |
| 4,603,876 A | 8/1986 | Gray | |
| 4,645,226 A | 2/1987 | Gustavsson et al. | |
| 5,150,911 A | 9/1992 | Williams | |
| 5,348,331 A | 9/1994 | Hawkins | |
| 5,873,595 A | 2/1999 | Hinte | |
| 5,941,551 A | 8/1999 | Harman et al. | |
| 6,565,108 B1 * | 5/2003 | Gearhart | 280/432 |
| 2006/0249926 A1 * | 11/2006 | Smith | 280/491.1 |
| 2008/0277903 A1 * | 11/2008 | Anderson et al. | 280/477 |

* cited by examiner

*Primary Examiner* — Paul N Dickson
*Assistant Examiner* — Marc A Scharich
(74) *Attorney, Agent, or Firm* — Hovey Williams LLP

(57) ABSTRACT

An alignment guide and remotely operated latch mechanism for use in coupling a towing dolly of a two trailer rig, the towing dolly being connected to a first trailer of the two trailer rig and used to pull a second trailer of the two trailer rig behind the first trailer, the alignment guide facilitating coaxial alignment of the towing dolly with the first trailer by pulling the first trailer and towing dolly forward with a tractor, and the alignment guide further facilitating the coaxially aligned first trailer and towing dolly to be backed up together for hitching the towing dolly to the second trailer.

2 Claims, 6 Drawing Sheets

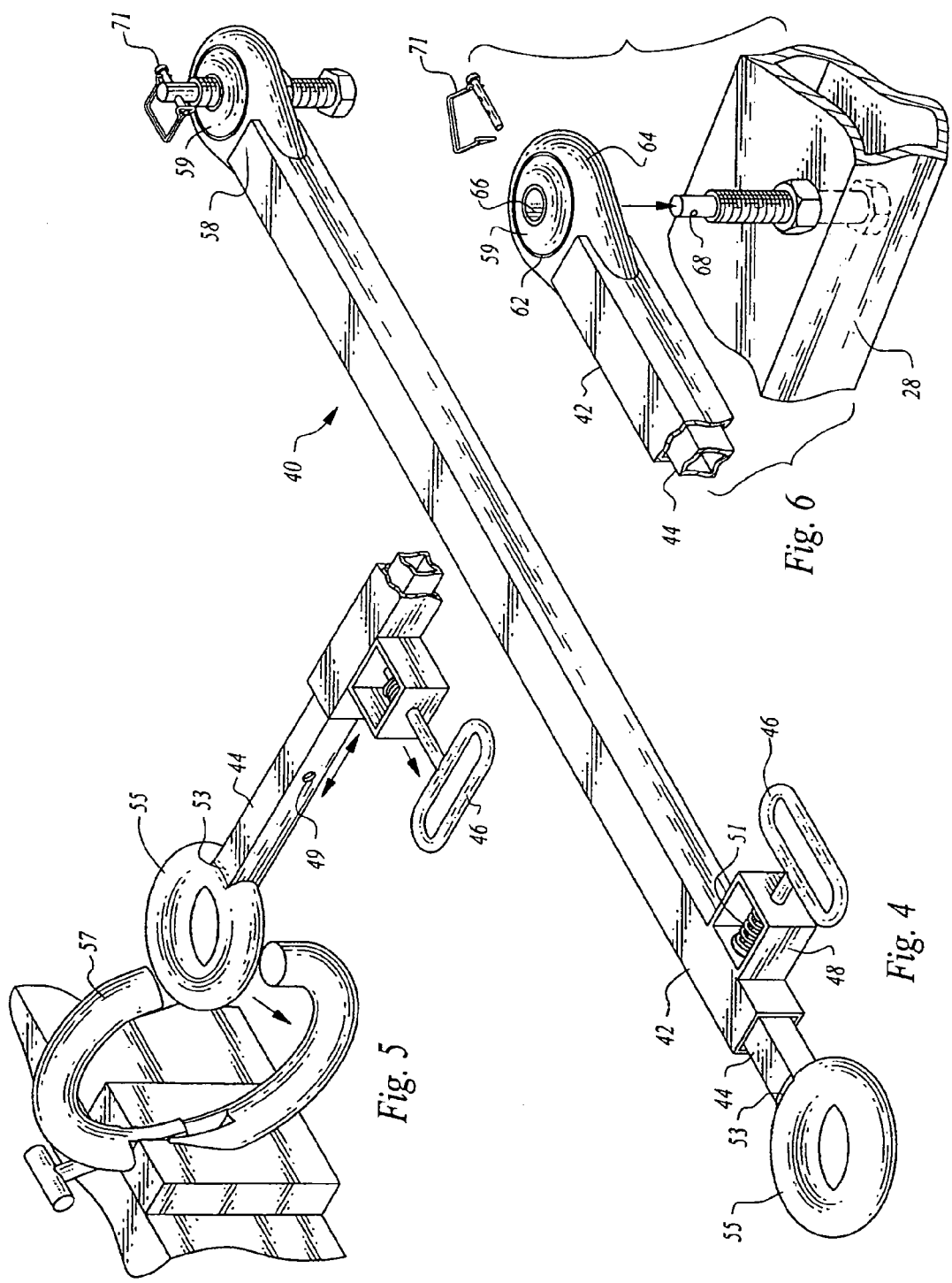

DOLLY ALIGNMENT GUIDE FOR LARGE, MULTI-TRAILER/VAN RIGS

CROSS REFERENCE TO RELATED APPLICATIONS

This application is a continuation in part of and claims benefit of, U.S. patent application Ser. No. 10/878,932, filed Jun. 29, 2004, which is hereby incorporated in its entirety by reference.

STATEMENT REGARDING FEDERALLY SPONSORED RESEARCH OR DEVELOPMENT

Not Applicable

BACKGROUND OF THE INVENTION

1. Field of the Invention

The present invention relates to an alignment guide device attached to a towing dolly for use by drivers of large, multi trailer/trailer/van rigs, also variously referred to as eighteen wheelers and tractor-trailer rigs, and, more particularly, to a device for assisting drivers of such multi trailer/trailer/van rigs to align a dolly in preparation for engagement with a rearmost trailer/trailer/van.

2. General Background of the Invention

Interstate trucking now commonly involves the use of multiple trailer/van rigs. In some states the use of multiple trailers is limited to Interstate or Toll roads, and the relative size of the vans may be limited. The second trailer or van is coupled to the rear of the first with a towing dolly which includes a fifth wheel device similar to that contained on the rear of the tow vehicle or tractor. Though these multiple unit rigs have been in common and expanding use over many years, the coupling of the vehicle elements at the outset of the trip remains a daunting exercise. The approach to the coupling starts with the coupling of the tractor to the first trailer. This is a straight forward exercise, with the trailer and fifth wheel in (relatively) full view. Once the first trailer is attached, it is then necessary to attach the towing dolly and the second trailer. One must either first, independently hitch a towing dolly to the second trailer and then back the first trailer into coupled relation with the towing dolly, or vice versa: back the first trailer into coupled relation with the towing dolly and then back the towing dolly (which is behind the first trailer) into coupled relation with the second trailer (aligning the fifth wheel on the towing dolly and hitching with the king/connecting pin on the second trailer). The first action requires considerable time and frequently the interaction of a separate tractor to move or position the towing dolly. Towing dollys are heavy, cumbersome and not easily moved without a tractor. The second action is extremely time consuming without the use of an alignment assist or guide of some sort (including a spotter to signal the driver) locking the towing dolly into a relative alignment position with the first trailer, with respect to the maneuvering activity by the driver/tractor in backing the towing dolly under the second trailer.

Big rig drivers, irrespective of experience and skill level, find it challenging to efficiently connect multiple trailer/vans to their tractor. Where there is but one trailer/van, e.g., a standard 53 foot trailer/van, or trailer, hooked up to a tractor, it is relatively simple to back the tractor under the fifth wheel king pin, lock it in place by means of the jaws on the lower fifth wheel hitch, connect the air hoses and electrical lines and drive away.

The style of trailer/van towing has evolved over the years to exhibit an increasing number of rigs comprising a tractor with two trailer/vans connected in tandem. Smaller trailer/vans are more flexible and, by pulling two such trailer/vans with a single tractor, it is more efficient to drop each trailer/van in a different locale, rather than unloading a portion of the larger trailer/van in one locale and taking the remainder of the load to another location.

With the advent of multiple trailer/van rigs, the trucking industry became more flexible and versatile, but the driver had the added task of hooking up the second, or rearward trailer/van. He did so, and does today, by means of an arduous multi step process which may take as much as thirty to forty minutes.

For example, the driver will first use the tractor to align a towing dolly with the rear trailer/van. He then hooks up the tractor to the forward trailer/van and backs up the forward trailer/van to the towing dolly which he has previously positioned. He then couples the towing dolly to the rear of the forward trailer/van, typically by a pintle hitch, and thereafter backs the towing dolly, which has been previously aligned, into the proper connective position, under the fifth wheel king pin of a second, or rear, trailer/van.

While easy to describe, the effort is not without its problems. The difficulty in such a multi tasking maneuver arises from several factors. Keeping in mind that during the backing operation, the forward trailer/van is free to move laterally (e.g., turn right or left) around the king pin engaged in the lower fifth wheel hitch and move up and down with variations in the terrain. Likewise, it should also be appreciated that the towing dolly is free to move about the pintle hitch. As a consequence, any relatively slight left or right turn of the tractor while backing up is likely to be exaggerated at the towing dolly, making control and alignment of the last element (the towing dolly) all that much more difficult.

Thus, to guide the fifth wheel hitch of the towing dolly under the king pin of the rear trailer/van, the driver must keep both the forward trailer/van and the towing dolly in essentially coaxial alignment, which is not an easy task and often requires more than one attempt to achieve proper alignment. If one also considers changes in elevation or roughness in the surface of the road, heights and other dimensions of the respective trailer/vans, or less than perfect visibility, an already difficult maneuver is exacerbated.

OVERVIEW OF THE PRIOR ART

As stated above, the nature of the problem to which the present invention is addressed is not particularly new. The present invention, however, provides a multi-faceted solution which combines several necessary elements uniquely to provide a straight-forward stabilization guide that is readily attached, self adjusting and remotely activated. In prior approaches, for example, Pettay, in U.S. Pat. No. 3,815,939, broached the problem by teaching the use of rigid hitch positioners 50 on either side of the dolly which are pinned to the forward trailer/van at mounts 60. The length of the positioners, were individually connectable and adjustable, and made no allowance for less than level terrain. In a similar fashion, and some 10 years later, Gray, in his U.S. Pat. No. 4,603,876, developed essentially the same concept, however with supplemental lateral bracing.

Morgan provides a slightly different approach in his U.S. Pat. No. 3,663,039 wherein a single poll, referred to as a telescoping lock bar 38, is provided. It suffers from the same disabilities as its predecessor, and its successors have seemed to not learn from prior deficiencies.

Gustavsson, et al., U.S. Pat. No. 4,645,226, and Stewart, U.S. Pat. No. 3,612,575, are two additional advocates of the dual bar concept of dolly control, and Hawkins, in his more recent effort disclosed in U.S. Pat. No. 5,348,331, adds a hydraulic system for controlling the length of the alignment system. None of these references suggest the alignment guide incorporated into the present invention, i.e. apparatus to facilitate 1) alignment of the towing dolly and 2) maintaining of that alignment while backing the towing dolly under the second trailer/van.

SUMMARY OF THE INVENTION

In the recited assemblage of patent art, no one of which appears to recognize the importance of, or suggest the complete solution to the problem solved by the present invention. The prior art demonstrates first, that there is no recognition of a satisfactory alignment guide, nor does one seem to be in popular usage, for a driver to effectively center and guide a towing dolly attached to the rear of a lead trailer/van into engagement with the king pin of a rear trailer/van and, secondly, that such a device may be effectively, self centering, accommodate uneven terrain and be remotely releasable, once coupled.

To this end, it is a principal objective of the present invention to provide the driver of a dual trailer/van big rig with a means of alignment for the towing dolly attached to the forward trailer/van with control against lateral drift so as to enable linearly advancing the towing dolly (fifth wheel) into engagement with the rear trailer/van (king pin) in a rapid and efficient manner.

An objective related to the foregoing, is to provide such a device which readily compensates for irregularities in the terrain at the hook up site. Similarly, it is a further objective to provide such a device which readily compensates for differences in the height and other dimensions of the rear trailer/van relative to the forward or lead trailer/van.

Yet another objective of the present invention is to provide such a device which is readily engaged and, when not in use, easily disengaged and stowed on the towing dolly by the driver without the use of special tools and/or additional assistance. The combination of the elements of the invention described enable a heretofore unknown means for the successive hook-up and coupling and uncoupling of the locking features of the alignment guide equipped towing dolly.

A still further objective of the present invention is to create a device which will accomplish all of the objectives attributable to it, while being readily portable, and remotely actionable, if and as needed.

The foregoing, as well as other objects and advantages of the present invention will become apparent to those skilled in the art when the Detailed Description of a Preferred Embodiment is read in conjunction with the accompanying drawings:

BRIEF DESCRIPTION OF THE DRAWINGS

FIG. 4 is a perspective view of the guide of the present invention;

FIG. 5 is a partial sectional view of the forward end of the guide of FIG. 4, shown in perspective and illustrating the engagement of the pintle hook mount to a pintle hook disposed at the rear of the forward trailer/van of the rig illustrated in FIG. 1;

FIG. 6 is a partial sectional view of the rear end of the guide of the present invention, depicting the cat's eye in preparation for engagement with the upstanding cat pin mounted to the towing dolly which engages by means of a fifth wheel to the rear trailer/van;

DETAILED DESCRIPTION OF PREFERRED EMBODIMENTS OF THE PRESENT INVENTION

Figure 1:
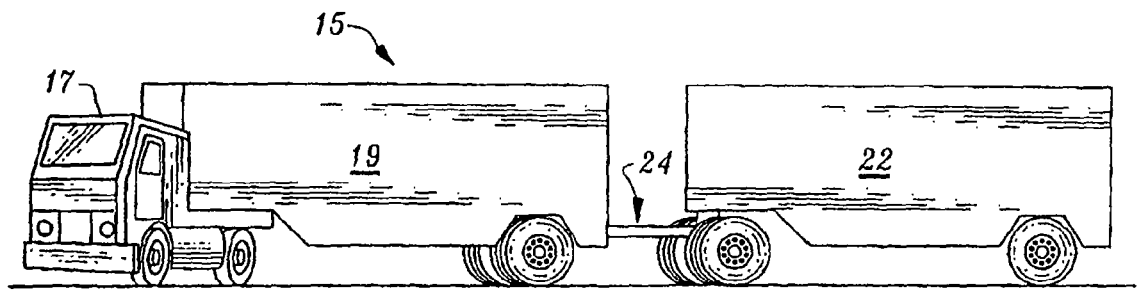
FIG. 1 is a pictorial representation of the environment in which the device of the present invention has a particular utility, namely a dual trailer/van rig.

With reference now to the drawings, and initially to FIG. 1, a typical dual trailer/van rig is illustrated at 15. The rig comprises several component parts, e.g., a tractor 17 which engages a forward trailer/van 19, which in turn, coupled to a rear trailer/van 22.

Figure 2:
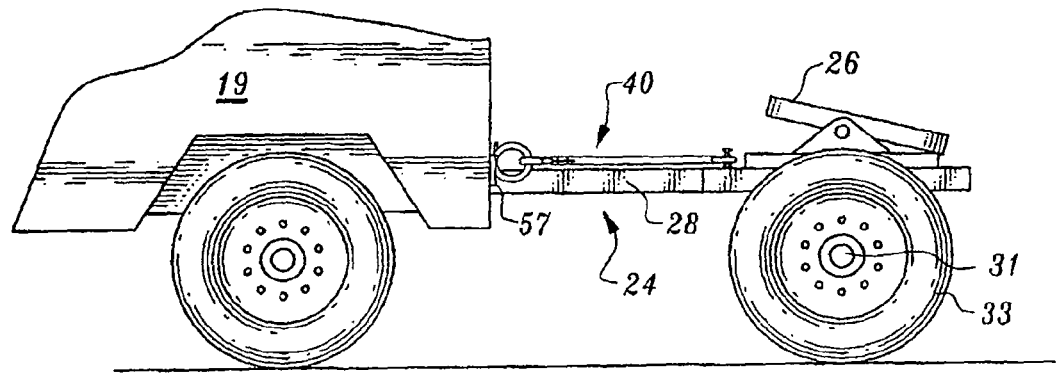
FIG. 2 is a side elevation illustrating the inter engagement between the forward trailer/van of a dual trailer/van rig, such as shown in FIG. 1, and the towing dolly used to hook up the rear trailer/van, with the guide of the present invention in place.
Figure 3:
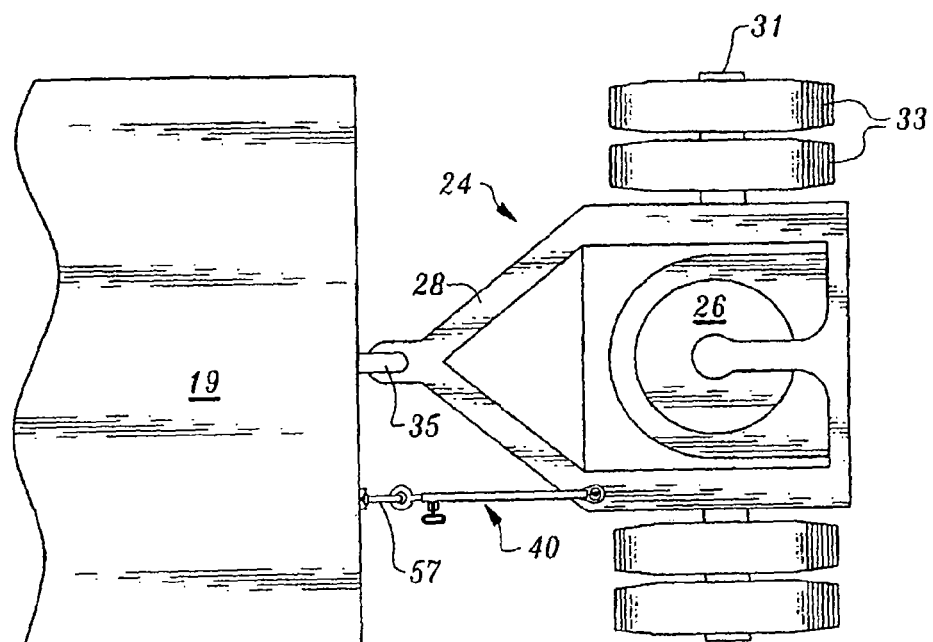
FIG. 3 is a top plan view of the forward trailer/van and towing dolly of FIG. 2.

The forward trailer/van 19 is hooked to the tractor by a typical fifth wheel assembly, well known in the art. The forward trailer/van does not directly engage the rear trailer/van 22. Rather, it attaches to a towing dolly 24, which carries a fifth wheel assembly 26 (FIG. 2). The towing dolly 24 includes a frame 28 supported by an axle 31 having wheels 33. The forward end of the towing dolly 24 is coupled to the rear of the forward trailer/van 19 by means of a customary pintle hook assembly 35, although other suitable attachments are well known in the art and within the contemplation of the invention.

One of the most frustrating and time consuming operations to be performed by the operator of the rig 15 is the hooking up of the rear trailer/van 22. The maneuvering required is chronicled earlier herein in the section relating to the Field of the Invention.

In keeping with the objectives of the present invention, and in aid of the operator's effort to accomplish the hook up of the rear trailer/van 22 in a most efficient and time saving manner, an alignment guide 40 is attachable to the towing dolly 24 as illustrated in FIGS. 2, 3 and 8 through 10. The alignment guide 40, illustrated in some detail in FIG. 4, includes an outer tubular member 42. An inner, telescoping tube 44 is nested within the tube 42 and is manually extensible to provide the proper length. It has been found that square tubing is well suited to this task, although tubing of other cross sections might well be used. A transverse locking pin 46 is affixed by means of a stanchion 48 to the outer tube. A series of holes 49 are formed in the inner tube 44 in serial relation along the longitudinal axis thereof. The series of four to six holes, spaced conveniently about two inches apart, are located along a section of the inner tube 44 spaced from the attachment means (cat's eye swivel 59, later described) of the outer tube 42 of alignment guide 40 a distance which generally provides longitudinal alignment of the towing dolly 24 with the forward trailer/van 19. In the present embodiment for a standard 53 foot trailer, the holes 49 are centered about 18 to 24 inches from the attachment means 59, depending upon the over-all length of the towing dolly 24 and the alignment guide 40. Thus, when the desired length is determined (as subsequently explained), the locking pin 46, which is biased by spring 51, may be inserted into one of the holes 49, thereby fixing the length of the alignment guide 40.

As previously indicated, the alignment guide 40 is coupled between the forward trailer/van 19 and the towing dolly 24, to lock the towing dolly in longitudinal alignment with the forward trailer/van 19, aiding the operator of the rig in moving the towing dolly 24 (and fifth wheel 26) rearwardly into coupled relation with the king pin of the rear trailer/van 22. To this end, the tube 44 is provided, at its free end 53, with a trailer/van connector such as pintle hook mount 55. The pintle hook 57, of well known construction, is affixed to the left side of the rear frame rail of the forward trailer/van 19, in position to selectively receive the pintle hook mount 55 when the alignment guide 40 is placed in use. See FIG. 5.

While the need for a tow bar/hitch to accommodate changes in elevation and/or attitude with respect to the towed vehicles, there has been no similar recognition of such a need in alignment guides for towing dollys. In the present invention, the other end 58 of the alignment guide 40 (being the free end of the outer tube 42) is, in accordance with the invention, adapted to be engaged with the left, or driver's side of the frame 28 on the towing dolly 24. For this purpose, the outer tube 42 supports a swivel fastening device in one form of which is preferred in this embodiment and referred to in the trade as a cat's eye-type swivel joint 59. The swivel fastening device 59, is of well known construction, and includes a center bearing member 62, which is secured, for limited rotation in a generally transverse plane, within an outer race 64. A central aperture 66 is provided for receipt of a cat pin 68 mounted, also, to the driver's side of the frame 28 of the towing dolly 24, when the alignment guide 40 is in use, and a fastener 71 secures the cat pin in a locked position in the center bearing member.

In practice, small but significant variations in elevation of the surface upon which the trailer/vans and towing dolly must maneuver cause difficulty in the process of hooking the rear trailer/van to the towing dolly. Moreover, while frame heights of the various towing and towed elements of the trailered unit are intended to be standard, however due to manufacturing tolerances, and to some extent, tire pressures, heights may vary, and the process of hooking up the rear trailer/van 22 is sometimes exacerbated. However, by using the alignment guide of the present invention, the flexibility in alignment provided by the cat's eye attachment 59 on the alignment guide 40 permits the operator to maneuver the towing dolly 24, despite the discrepancies chronicled above. The flexibility provided in the present invention is in addition to whatever analogous flexibility may also be provided in the towing dolly itself, or equivalent tow hitch.

Figure 7:
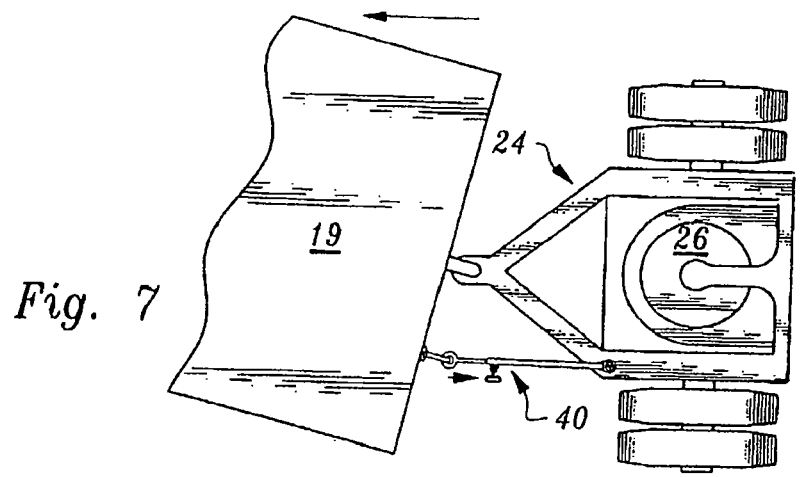
FIGS. 7, 8 and 9 are top plan views in the nature of FIG. 3, illustrating the response of the towing dolly during movement of the forward trailer/van of the rig, with the guide of the present invention, as the operator attempts to maneuver the towing dolly into engagement with the king pin of the rear trailer/van of the rig.
Figure 8:
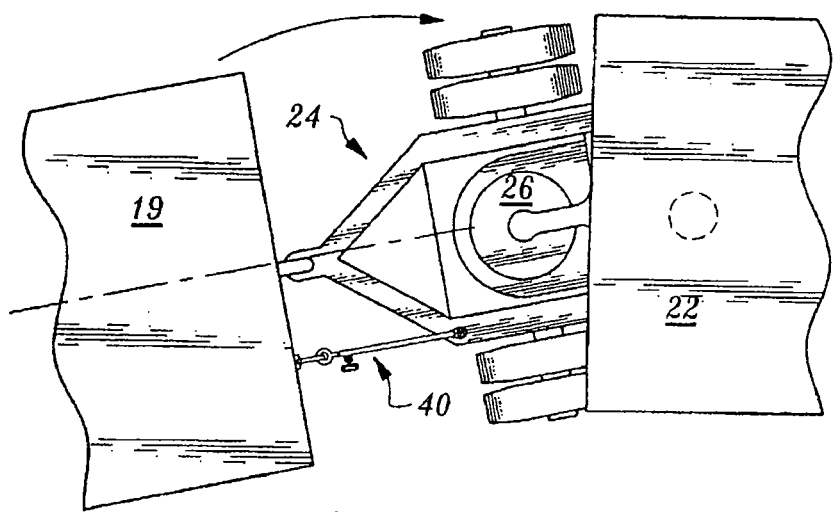
Figure 9:
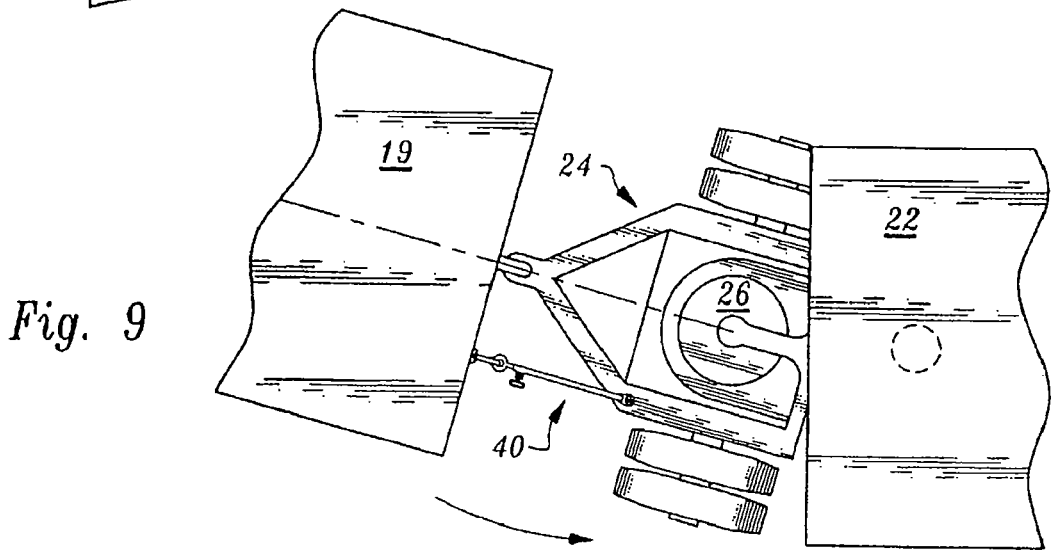
Figure 10:
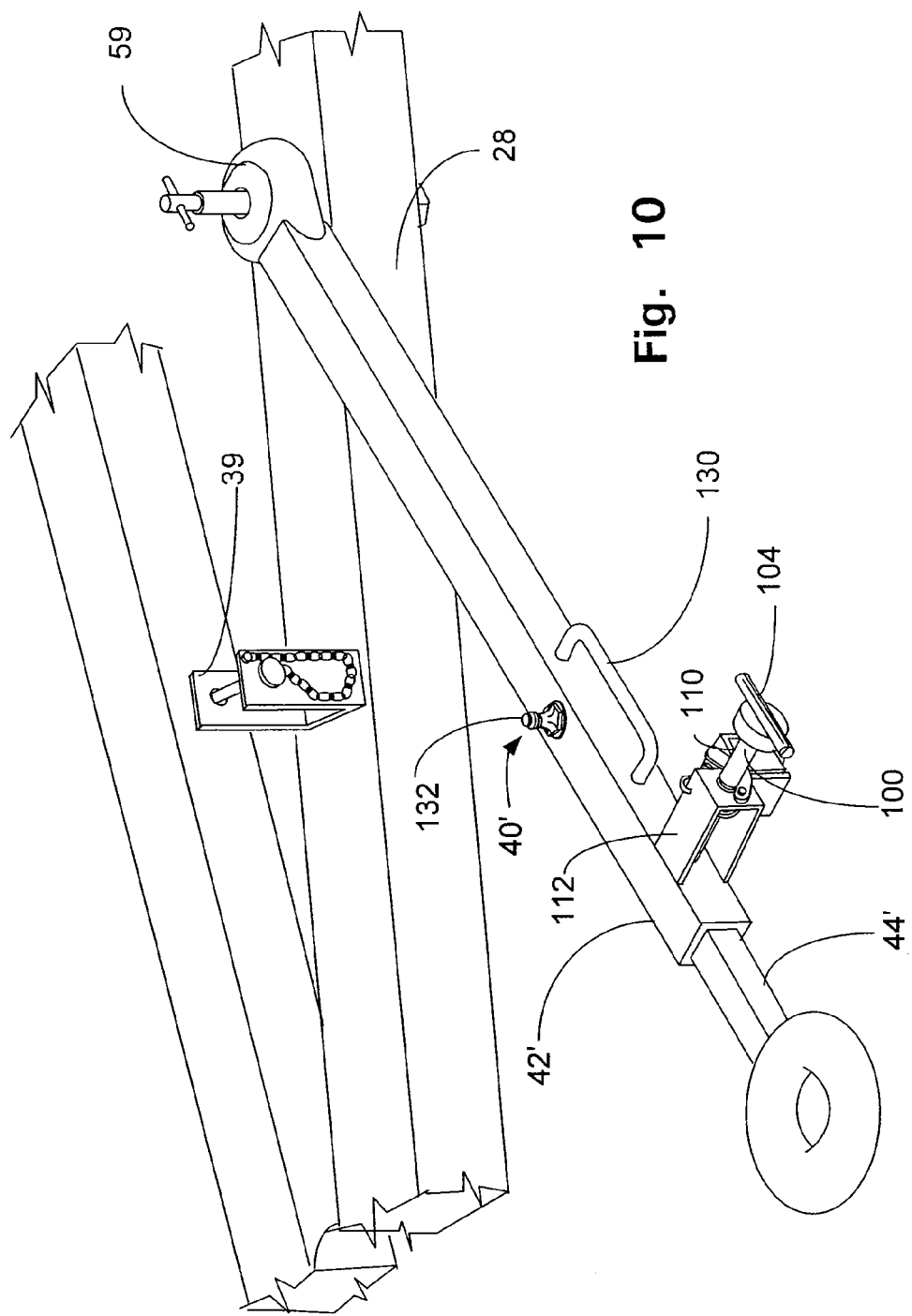
FIG. 10 is a pictorial view of the alignment guide of the invention, showing its mounting on a towing dolly.
Figure 12:
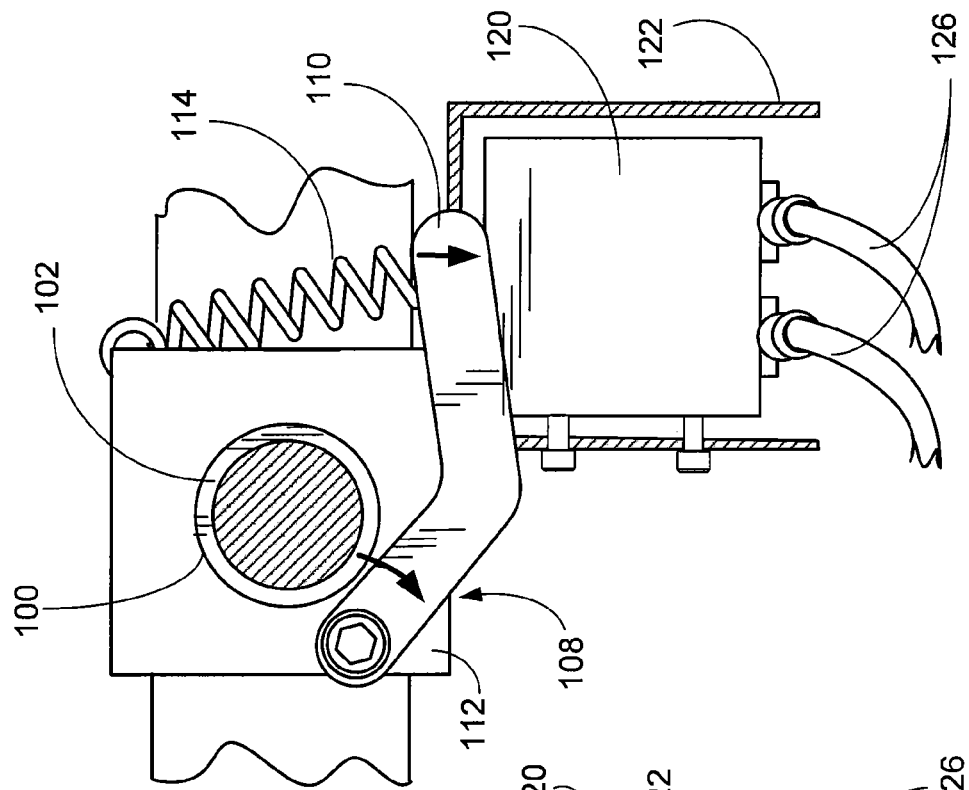
FIG. 11 and FIG. 12 are partial elevational views of the locking actuator for the transverse pin.
Figure 11:
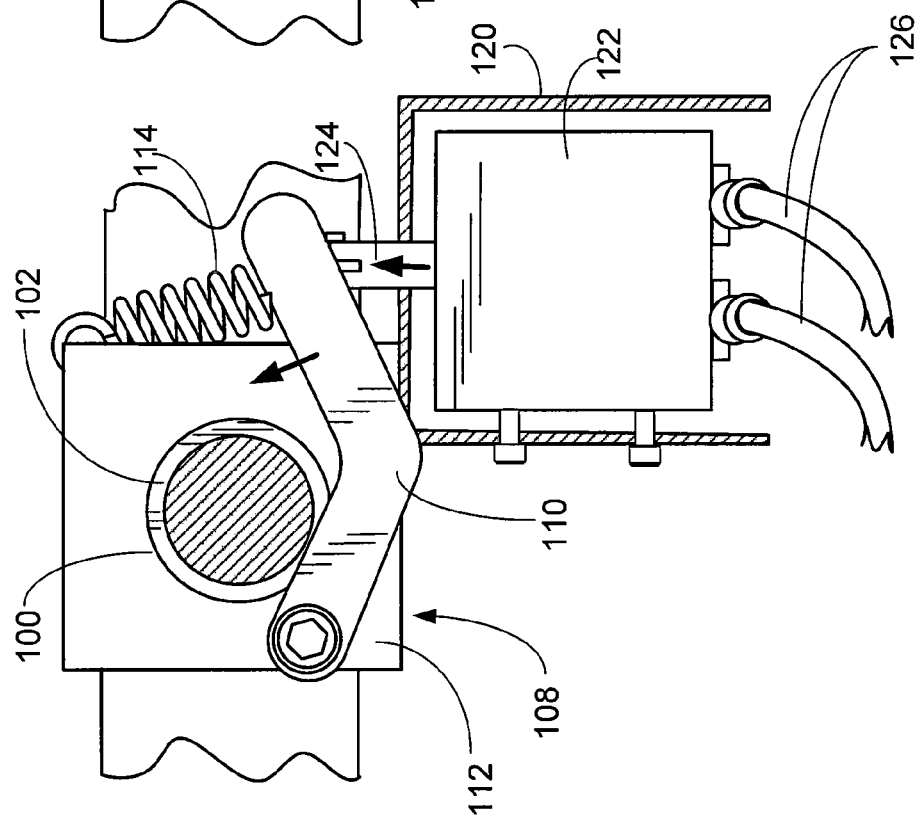
Figure 13:
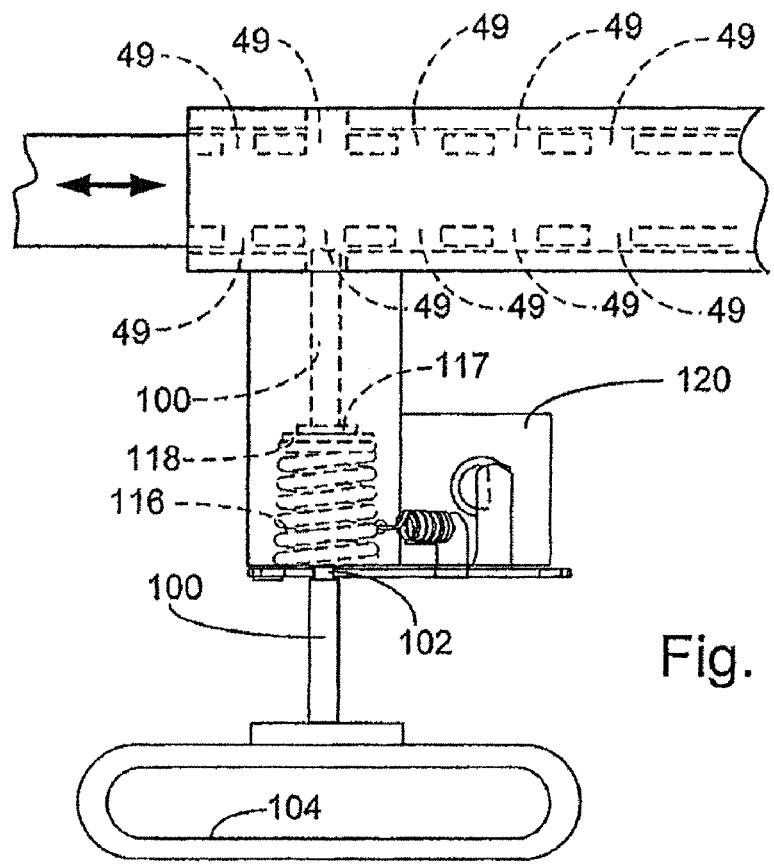
FIGS. 13 and 14 are partial plan views of the transverse pin and mounting together with the actuator.
Figure 14:
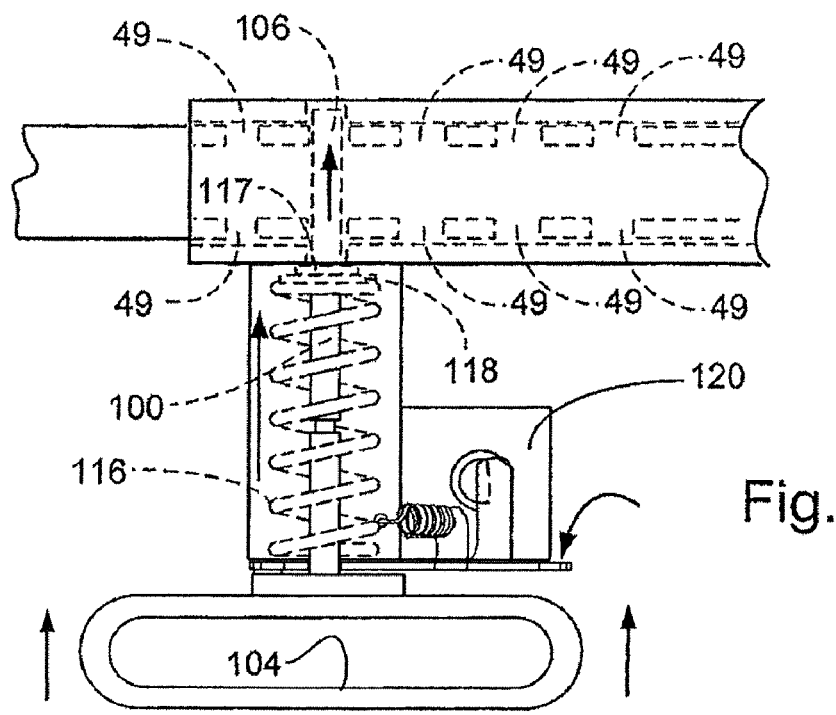

As best seen in FIGS. 7, 8 and 9, with the alignment guide 40 in place on the towing dolly 24, the operator can readily control the towing dolly 24 in its movement as the tractor 17, forward trailer/van 19 and towing dolly 24 are backed under the king pin of the rear trailer/van 22, thereby eliminating several frustrating attempts (and significant wasted time) at aligning the fifth wheel 26 of the towing dolly 24 into connecting engagement with the king pin.

As illustrated in FIGS. 10 through 14, an alternative embodiment of the alignment guide 40' on towing dolly 24 is shown in which the operation of transverse locking pin 100 may be controlled remotely by the operator of the tractor 17 for the dual van 19/22. In this embodiment, transverse locking pin 100 includes annular groove 102 located at a point intermediate of a handle portion 104 of transverse locking pin 100 and opposing end portion 106 of transverse locking pin 100. This embodiment also includes safety latch mechanism 108, which is comprised of latch member 110 that is pivotally connected to stanchion 112. One end of a safety spring 114 is connected to the end portion of latch member 110, opposing the end portion of latch member 110 that is pivotally connected to stanchion 112. The other end of safety spring 114 is connected to stanchion 112 such that latch member 110 is biased to be in contact with transverse locking pin 100. When the transverse locking pin 100 is retracted such that the biasing spring 116 is compressed between the washer 118, abutted against a projection 117 extending from the transverse locking pin 100, and the inner surface of stanchion 112 (from pulling laterally outward on handle 104), safety spring 114 causes latch member 110 to seat into annular groove 102, thereby latching the transverse locking pin 100 in its retracted position. When so latched, transverse locking pin 100 is disengaged from holes 49 and the inner tube 44' is free to telescope and move inwardly and outwardly of outer tube 42'.

Also connected to stanchion 112 is solenoid 120 that includes coil portion 122, armature 124, and electrical cable 126. Armature 124 is connected at the same end portion of latch member 110 adjacent to safety spring 114. When the coil portion 122 of solenoid 120 is energized, the resulting electromagnetic field applies a force to armature 124 that causes armature 124 to be drawn into coil portion 122. The force applied to armature 124 is sufficient to overcome the spring force of safety spring 114, which causes latch member 110 to be unseated from annular groove 102 thereby releasing transverse locking pin 100 from its retracted position In one embodiment, electrical cable 126 is adapted to be plugged into a light socket or auxiliary receptacle in forward van 19, or alternatively, may be hard-wired into the tractor and actuated by a dedicated switch. In this embodiment, the operator energizes coil portion 122 of solenoid 120 by turning on the lights of forward van 19. Coil portion 122 is de-energized by turning off the lights.

The illustrated embodiment further includes a handle 130 to facilitate the installation of alignment guide 40' and grease fitting 132 to allow the introduction of a lubricant into outer tubular member 42' to facilitate the movement of inner telescoping tube 44' within outer tubular member 42'.

This embodiment permits the operator to install the alignment guide 40' at the same time the operator connects the forward van 19 to the towing dolly 24. When the operator installs the alignment guide 40', the operator will retract the transverse locking pin 100 until the latch member 110 seats into annular groove 102, thereby latching the transverse locking pin 100 in its retracted position. The operator additionally connects electrical cable 126 to a light socket or auxiliary receptacle in forward van 19. When installed in this manner, inner telescoping tube 44' is permitted to move relative to outer tubular member 42'. Thus, the operator can drive the forward van 19 to another point in the yard or elsewhere with the alignment guide 40' connected to the forward van 19 and to the towing dolly 24 because the towing dolly 24 is permitted to pivot relative to the forward van 19.

Once the operator has located and approached the rear van 22, the operator maneuvers the front van 19 and towing dolly 24 generally in front of rear van 22. The operator then energizes coil portion 122 of solenoid 120 causing the latch member 110 to unseat and disengage from annular groove 102, thereby releasing the transverse locking pin 100 from its retracted position. The operator then pulls forward causing the transverse locking pin 100 to seat into one of the series of holes 49 in the inner telescoping tube 44', which results in the towing dolly 24 being fixed and coaxially aligned in relation to the forward van 19 such that the coaxially aligned towing dolly 24 will not pivot relative to the forward van 19 as the operator backs up the forward van 19 and towing dolly 24 towards the rear van 22.

As one can see, this embodiment has the benefit of greatly reducing the need for the operator to climb in and out of the tractor 17 since the operator can install the alignment guide 40' at the same time that the operator connects the towing dolly 24 to the forward van 19 because the operator can remotely release the transverse locking pin 100 to prevent the towing dolly 24 from pivoting relative to the forward van 19 once the operator has backed up and approached the rear van 22. Thus, the operator does not have to enter and exit the tractor 17 at interim points between connecting the towing dolly 24 to the forward van 19 and backing up the towing dolly 24 under the rear van 22 in order to gain the benefit of using the alignment guide 40'.

It will be appreciated that the alignment guide 40' may be disengaged from the pintle hook 57 once the rear van 22 is coupled to the towing dolly 24. The alignment guide 40' may then be secured for travel on the frame 28 by a saddle and pin 39 (and the attachment means 59) or may be portable by disconnecting the attachment means 59 of the alignment guide 40' and readily stowing the alignment guide 40' in or on the tractor 17, as desired.

Minor variations in the elements of the alignment guide may be made by those skilled in the art. It is intended that the novel invention set forth herein should be limited only by the scope of the appended claims, rather than by the specific embodiments set forth as illustrative of the invention.

The invention claimed is:

1. An alignment guide for use in coupling a trailer-pulling dolly of a two trailer rig, said dolly being connected to a first trailer of the two trailer rig and used to pull a second trailer of the two trailer rig behind the first trailer, said alignment guide facilitating coaxial alignment of the dolly with the first trailer by pulling said first trailer and dolly forward with a tractor, and further facilitating the coaxially aligned first trailer and dolly to be backed up together for hitching the dolly to the second trailer, the alignment guide comprising:

telescoping inner and outer tubes,
said inner tube having a first end portion for connecting to the first trailer during the coaxial alignment with the dolly and hitching of the second trailer with the dolly,
said outer tube having a second end portion for connecting to the dolly,
said inner tube having a plurality of spaced apertures; and
a remotely operated latching mechanism including—
a stanchion coupled with said outer tube,
a spring-biased transverse locking pin coupled to the stanchion,
said spring-biased transverse locking pin having a first end portion with a handle portion coupled to the first end portion of the spring-biased transverse locking pin, an opposing second end portion, and an annular groove defined in the spring-biased transverse locking pin located between the first end portion and the second end portion of the spring-biased transverse locking pin,
said spring-biased transverse locking pin further sized to be received within the apertures of the inner tube,
a latch member having first and second end portions and being pivotally connected to the stanchion at said first end portion of the latch member,
said latch member sized to engage with the annular groove in the spring-biased transverse locking pin,
said latch member being coupled with a spring for selectively biasing the latch member so as to engage with the spring-biased transverse locking pin, and
a solenoid having an armature extending therefrom and being connected to said second end portion of the latch member,
whereby the spring-biased transverse locking pin is maintained in a retracted position by moving the handle portion so as to cause the latch member to engage with said annular groove to prevent the spring-biased transverse locking pin from seating into one of said apertures in said inner tube, and
whereby said spring-biased transverse locking pin is released from the retracted position by energizing the solenoid and causing the armature to apply a force to the latch member sufficient enough to cause the latch member to disengage from said annular groove such that the spring-biased transverse locking pin may seat into one of said apertures in the inner tube as the inner and outer tubes telescope as the first trailer and dolly are pulled forward, thereby locking the dolly in coaxial alignment with the first trailer.

2. A remotely operated latching mechanism for an alignment guide for use in coupling trailers of a multi trailer rig, said remotely operated latching mechanism comprising:

a stanchion extending outwardly from an outer tube portion of the alignment guide and having a first end coupled with the outer tube portion of the alignment guide, an opposing, second end spaced outwardly from the first end, wherein the second end of said stanchion includes an aperture in coaxial alignment with a hole defined in the outer tube portion of the alignment guide;
a locking pin sized to be received within said aperture of the stanchion and said hole in the outer tube portion of the alignment guide, wherein said locking pin has a handle portion located at a first end portion of the locking pin and a second end portion opposing the first end portion of said locking pin;
an annular groove defined in the locking pin at an intermediate point between the handle portion and the second end portion of the locking pin;
a first spring surrounding the locking pin and being compressed between said first and second ends of the stanchion, whereby said first spring causes said locking pin to be biased inwardly toward the outer tube portion of the alignment guide;
a latch member pivotally connected at a first end portion to the second end of the stanchion, wherein said latch member has a thickness that allows it to engage with the annular groove in the locking pin when the locking pin is retracted away from the outer tube portion of the alignment guide, thereby causing the locking pin to be latched in a retracted position;
a second spring connected to an opposing second end portion of the latch member and to the stanchion, whereby a force of said second spring causes the latch member to be normally biased into engagement with the locking pin; and
a solenoid assembly connected to the stanchion, said solenoid assembly having an electromagnetic coil and an armature extending therefrom and being connected to the second end portion of the latch member, said electromagnetic coil being in switchable connection with a power source, whereby when said electromagnetic coil is energized, said armature applies a force to the latch member sufficient enough to overcome the force of the second spring, thereby causing the latch member to disengage from the locking pin.

* * * * *